W. K. PORTER.
INDICATOR.
APPLICATION FILED JUNE 30, 1913.

1,087,824.

Patented Feb. 17, 1914.
6 SHEETS—SHEET 1.

Witnesses
L. Cloud Newman.
G. W. Kirkley

Inventor
W. K. Porter
By Robert Roff
Attorney

W. K. PORTER.
INDICATOR.
APPLICATION FILED JUNE 30, 1913.

1,087,824.

Patented Feb. 17, 1914.
6 SHEETS—SHEET 5.

Witnesses
L. Cloud Newman.
J. W. Kirkley

Inventor
W. K. Porter
By Robert Robb
Attorneys

UNITED STATES PATENT OFFICE.

WILLIAM K. PORTER, OF PITTSBURGH, PENNSYLVANIA.

INDICATOR.

1,087,824.  Specification of Letters Patent.  Patented Feb. 17, 1914.

Application filed June 30, 1913. Serial No. 776,662.

*To all whom it may concern:*

Be it known that I, WILLIAM K. PORTER, a citizen of the United States, residing at Pittsburgh, in the county of Allegheny and State of Pennsylvania, have invented certain new and useful Improvements in Indicators, of which the following is a specification.

The present invention relates to improvements in indicating devices particularly adapted for designating the name of the next street, station, or stop for railway trains, street cars, subway trains or the like. It will be obvious, however, as this description proceeds, in its broad sense the invention is susceptible of various uses, such, for instance, as when located at a station to designate or announce the destination, route or direction of the next arriving train or public conveyance.

To the end of accomplishing the above purpose, the device comprises essentially certain web rolls to hold and receive an indicating web member or curtain in combination with feeding mechanism adapted to be intermittently operated so as to carry the web from one roll to another and to disclose the indicia thereon, regulating means being employed to govern the extent of intermittent movement of said web.

A further object of my invention is to provide coöperating tension mechanism for the web rolls, whereby movement of both holding and receiving rolls may be suitably controlled, one to wind up the web and the other to pay out the same in a retarded manner to insure proper travel of this indicating member.

Still another object in mind is the provision of reversing mechanism whereby the direction of travel of the web aforesaid may be readily reversed, accompanied by simultaneous reversal of the feeding and tensioning mechanism just mentioned, and in conjunction with this, novel means capable in one position of locking the various mechanism for proper operation when once set and in another position of braking or locking against operation the tensioning mechanism during the reversing action.

It is also contemplated to employ a route indicator in connection with the foregoing which is automatically operated during the actuation of the reversing mechanism.

With the above and other objects in view, this invention consists in the construction, combination and arrangement of parts all as hereinafter more fully described, claimed and illustrated in the accompanying drawings, wherein—

Throughout the following detail description, and on the several figures of the drawings, similar parts are referred to by like reference characters.

*General description.*—Referring to the drawings, and describing an embodiment of my invention, as adapted for use in conjunction with street cars or the like, to indicate the names of streets in their order of succession, it is to be understood that the mechanism comprising the same is preferably inclosed in a suitably shaped casing designated by the numeral 1, access to which is gained through the door 2 at the top of the same, the latter being hinged at the rear portion of the casing as indicated by the character 3. The front portion of the casing adjacent the top is suitably marked with the words "Next street", the name of which appears through the glass panel 4 therebeneath. The casing has also suitably mounted on its bottom spaced guideways 5 which are adapted to slidably engage with the bracket arms 6, by means of which the device is supported at a convenient place for observation by the passengers, the rear edge portion of said casing having bolt receiving plates 7 and pivoted ring members 8 through the latter of which a locking rod 9 passes to secure the casing firmly in place. Within the casing and at its front portion are mounted an upper and a lower flanged web receiving roll 10, 11, having their bearings in the side frames or standards 12, 13. Each of these rolls comprises a removable section $a$, having a plurality of openings therein to receive the studs 14 on the main body portion of said rolls, the latter also having at one end a pivoted clamping member $b$ beneath which one end of the section $a$ engages, while at the other end is disposed a latch member $c$ to interlock with the hooked end of said section $a$. It will be readily understood from the foregoing that the web or curtain 15 bearing the street names or other indicia, having suitable eyelets at its end portions, is hooked over the studs 14 beneath the section $a$ of one of these rolls upon which said web is to be wound, this roll being hereinafter referred to as the web receiving roll, while the other of the rolls from which the web is unwound will be called the web holding roll, these terms being interchangeably used according to the direction in which the web is passing.

Figure 3:
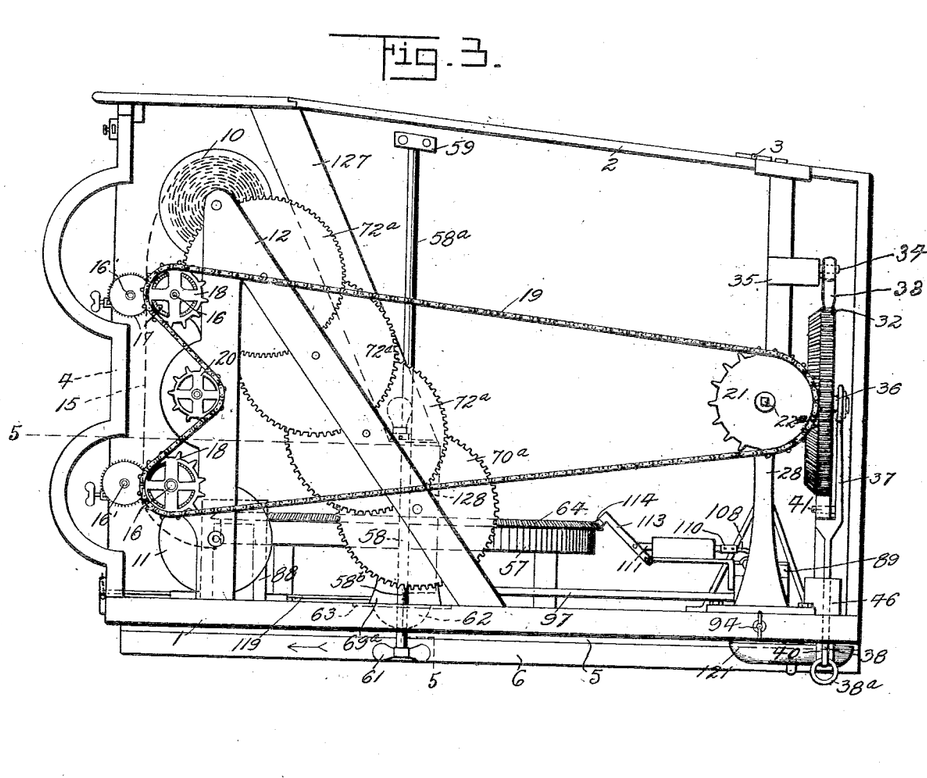
Fig. 3 is an end elevation the end of the casing being also omitted to show the details of the internal mechanism.

*Feeding mechanism.*—Between the web rolls 10, 11 and suitably spaced therefrom as well as from each other, are two sets of feeding rolls, each set consisting of a pair of rolls 16 and 16′ having intermeshing pinions 17 at their end portions. The shaft of one of the rolls 16 of each set extends beyond the side frame 12 and fixedly secured to these ends are the cog wheels 18 around which passes a driving chain 19. As seen most clearly in Fig. 3, this chain also passes around an idler wheel 20 mounted in the frame 12 and receives motion from a large sprocket wheel 21 secured to the outer extremity of the driving shaft 22. It will be observed that the other one of each set of feed rolls 16′ is adjustably mounted with respect to its coöperating roll 16, the latter having its bearings in the journal 17′ formed on the slotted arm 23 projecting forwardly from the frame 12, while the former is mounted in the journal 17″, formed on the slidable casing 24 and extending through the slotted arm aforesaid. Within the casing 24 is mounted the adjusting screw 25 having a spring 26 adapted to be tensioned by the adjustment of the threaded end 27 formed at its inner extremity, whereby the frictional contact of the coöperating rolls may be suitably governed, the faces of said rolls being preferably corrugated to insure positive gripping of the web 15 which is passed between these feed rolls on to the web receiving roll. These feed rolls are similarly mounted at each end as will be obvious.

Figure 4:
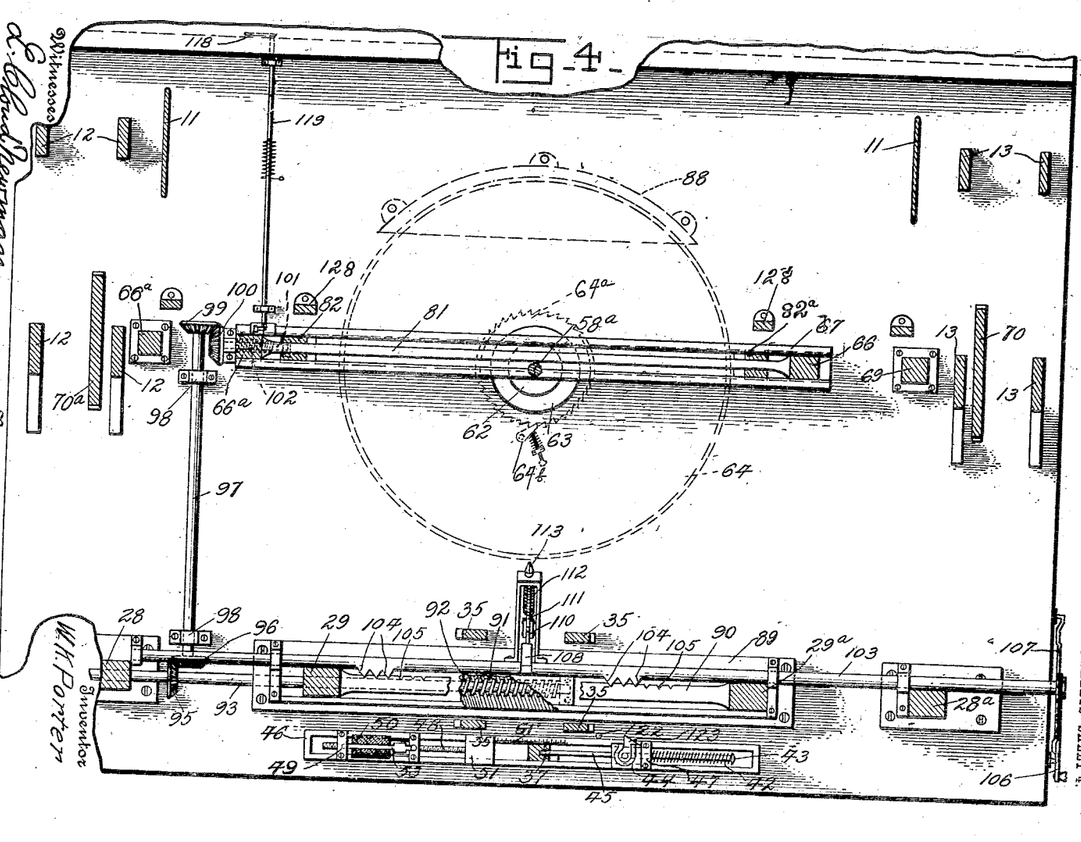
Fig. 4 is a horizontal sectional view taken on the plane indicated by the line 4—4 of Fig. 2.
Figure 5:
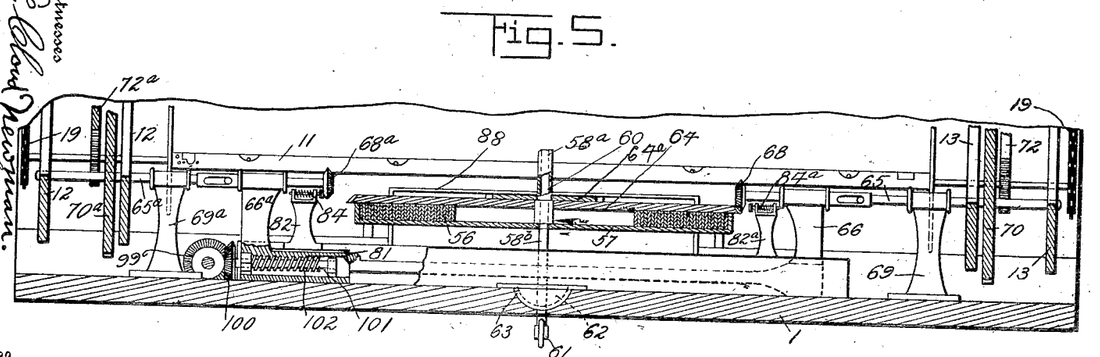
Fig. 5 is a fragmentary vertical sectional view taken about on the line 5—5 of Fig. 3, and showing more clearly the tensioning mechanism for the web rolls.
Figures 6, 15:
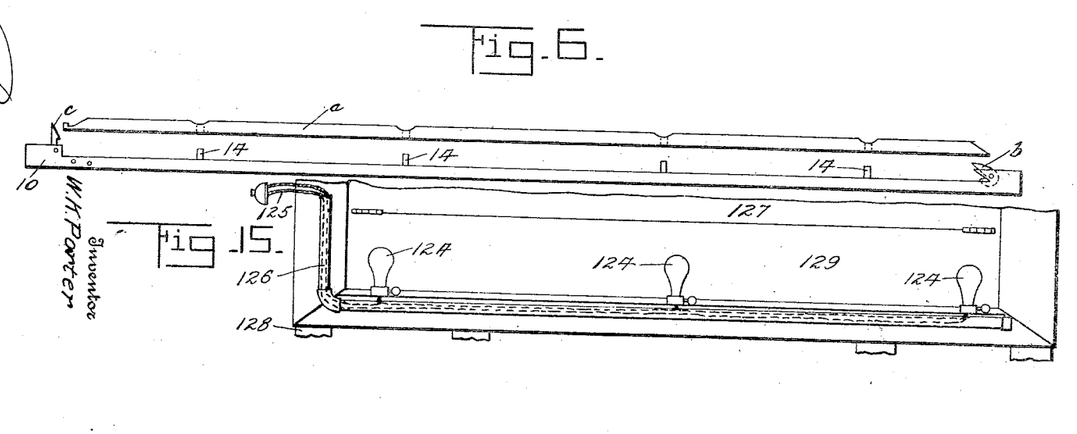
Fig. 6 is an enlarged detail view of one of the web rolls alone.
Fig. 15 is a detail view showing more plainly the illuminating means for the indicating device constituting my invention.
Figure 7:
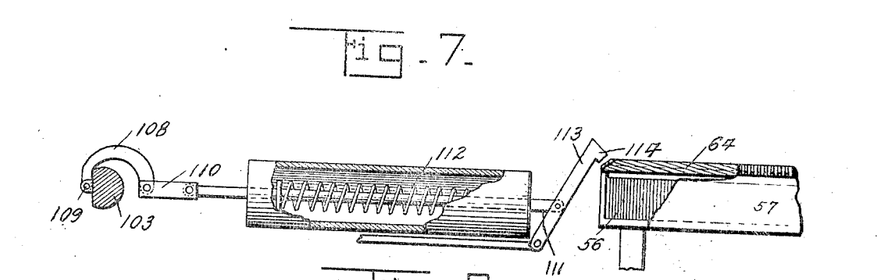
Fig. 7 is an enlarged view partly broken away and in section of the brake for the spring actuated gear of the tensioning mechanism adapted to be operated by the locking rod.
Figure 8:
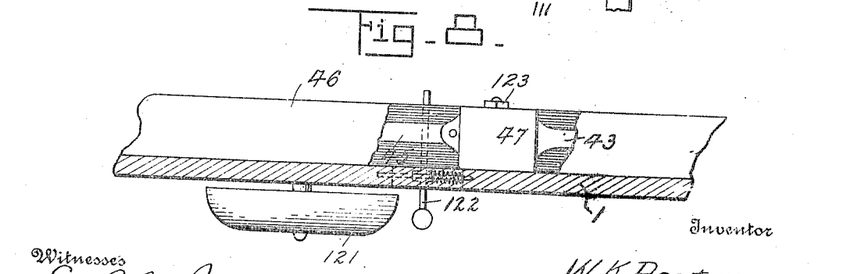
Fig. 8 is a fragmentary view of the alarm or signal used in connection with my device.
Figures 9, 10, 12:
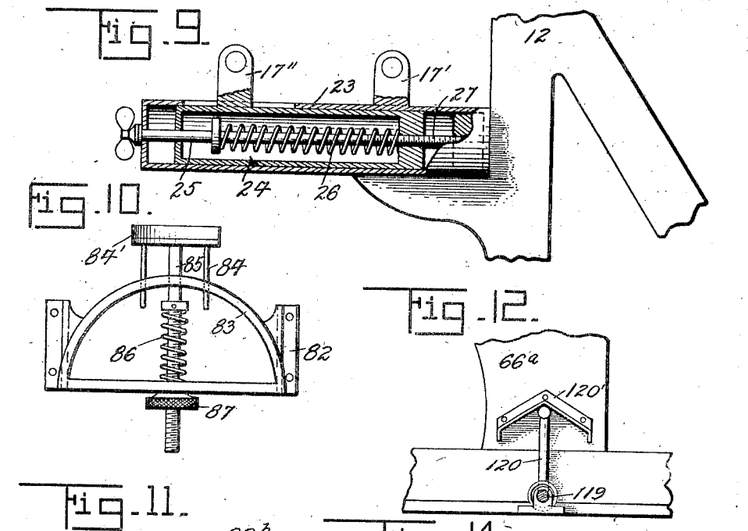
Fig. 9 is a fragmentary sectional view showing the means for adjusting the tension of each set of web feeding rolls.
Fig. 10 is a top plan view of the brake for retarding the movement of the web holding roll.
Fig. 12 is an enlarged detail view showing more clearly the coöperation of the route indicator with the movable standards for the actuating shaft of the web roll tensioning mechanism.

Returning to the description of the driving shaft 22 which is revolubly mounted in the upper end of the standard 28, this shaft is divided, and comprises the relatively stationary portion $22^a$ and the movable portion $22^b$ journaled in the arm 29, these sections having pin and slot connection as indicated by the reference numeral 30. The inner extremity of the driving shaft 22 carries a beveled pinion 31 which engages with the main driving gear 32 beveled on its inner peripheral edge portion for properly meshing with said pinion. The true periphery of this driving wheel or gear 32 is also notched so as to be locked against movement in one direction by engagement therewith of a gravitating pawl 33 mounted above said gear on a shaft 34 projecting rearwardly from the supporting standard 35 adjacent the inner face of the gear 32. The driving wheel or gear 32 itself is keyed to a shaft 36 revolubly mounted in the standard or support 35 and the outer end of this shaft 36 carries the upper end of a stroke lever 37 which is loosely connected with the shaft in any desired manner. The lever 37 extends downwardly a suitable distance so as to project slightly below the bottom of the casing 1 where it is connected to an actuating rod 38 by means of a link 39, the rod aforesaid preferably extending transversely of the casing and being suitably supported by one or more supports 40. Furthermore the actuating lever has pivotally connected thereto at a point directly adjacent the lower portion of the drive gear 32 a spring actuating pawl 41 which is normally held in engagement with the notched periphery of said gear, whereby upon pulling the rod 38 the drive gear 32 will be moved a predetermined amount, transmitting its motion to the drive shaft 22 when the parts are in the position shown in Fig. 2. As the stroke lever 37 is actuated by the pawl the spring 42 carried on the headed rod 43 which is connected to a sliding guide member or block 44, the latter in turn being connected to the lever 37 by the link 45, is placed under compression so that when the rod 38 is released the lever 37 will assume its initial position ready for a subsequent stroke. As shown by Fig. 4 the guiding block is suitably mounted so as to slide in the guideway 46 and an abutment 47 limits the movement of said block 44 in one direction as well as forming the seat against which the spring 42 is compressed.

*Stroke regulating mechanism.*—As the web 15 must be intermittently moved a predetermined distance in order to bring the names of the streets successively to a proper position to appear before the glass 4 it is desirable to employ means for regulating the extent of movement of the stroke lever 37 so as to coincide with the spacing between the respective street names. That is to say, one stroke or pull of the actuating rod 38 is designed to bring the name of the next succeeding street to the exact position before the glass 4 and in order that this may be accomplished I have mounted a threaded rod 48 in a correspondingly threaded block 49 disposed near one end of the guide way 46, said rod having a knurled portion 50 whereby on turning to increase or diminish the distance between the stop or head 51 located at one end of said rod and the stroke lever 37. The rod 48 is formed, furthermore, with a cross-shaped portion 52 adjacent the knurled portion 50 whereby the said rod may be locked in its adjusted position by means of a spring 53 secured at one end to the block 49 and formed near its opposite end with depending flanges 53' adapted to be engaged over the cross like portion 52 on the same. The spring 53 is held in its engaged position by means of an adjusting screw 54 which passes through the free end of said spring and into a suitable block member 55 therebeneath. When once the stroke regulating mechanism hereinbefore described has been set to conform to the proper stroke of the particular web further adjustment is not required, and the advantage of the foregoing will be obvious to those skilled in the art. It is understood that webs bearing various indicia may be employed in connection with the mechanism comprehended by this invention. A scale 51' on the interior of the guide way 46 with which the head 51 coöperates, facilitates proper adjustment.

*Tensioning mechanism for web rolls.*— In order to insure a proper feeding of the web from the holding roll to the receiving roll it is desirable that tension be exerted on both of these rolls, the tension on the receiving roll winding up the web as fast as it is fed thereto by the feed rolls 16, while that on the web holding roll tending to retard the unwinding from this roll and in this manner holding the web rigid or taut. To this end I have provided means for storing up energy in the form of a large main spring 56 which is disposed substantially centrally of the casing 1 in a case 57 to which one end of the spring is secured while its opposite end is fastened to a vertical shaft 58 secured at its upper end in a transverse bar 59 which is in turn fastened to the sides or ends of the casing 1 in any desired manner. The shaft 58 is preferably divided the upper portion 58ª being stationary and formed with a hollow bearing 60 at its lower end into which the lower movable portion 58ᵇ of the shaft extends. The movable portion 58ᵇ of this shaft 58 projects through the casing 1 and has secured thereto a manipulating key 61 by means of which the spring may be wound to place the movable portion 58ᵇ under tension. It is also preferable to enlarge the movable portion of the shaft 58 as indicated by the numeral 62 so as to give a substantial bearing to the same, this enlarged portion being mounted in a socket 63 fastened to the bottom of the casing 1. Directly above the spring and forming a cover for the casing 57 is located a large disk 64, the periphery of which is toothed and this disk or gear is connected to the movable portion of the shaft 58 by a ratchet wheel 64ª keyed thereto and engaged by the dog 64ᵇ. In the position of the mechanism shown in Fig. 2, the tension from the spring is transmitted to a divided shaft 65 disposed on the opposite side of the casing to the main drive shaft 22, said shaft 65 having its bearing in a movable arm 66 slidably mounted in a guide way 67. The inner end of the shaft 65 has secured thereto a pinion 68 adapted to mesh with the large tension gear 64 and the other end of said shaft is revolubly mounted in a bearing at the upper end of the standard 69. This end of the shaft 65 extends into the side frame 13 and has secured thereto a large gear 70. Through a train of small gears 71 and large gears 72 motion is carried from the shaft 65 to the pinion 73 on the short shaft 74 located at the top of the side frame 13. One end of this shaft 74 has fixed thereto a beveled pinion 75 which meshes with a similar pinion 76 secured to a vertical shaft 77 revolubly mounted in the bearings 78 projecting laterally from the side frame 13. The lower end of the vertical shaft 77 is provided with a beveled pinion 79 meshing with a similar pinion 80 which is secured to one end of the web roll 11. Hence following the foregoing cycle of operations the tension from the spring 56 is transmitted indirectly to the roll 11 under which condition this roll acts as the web receiving roll and as the web is fed by the feed rolls 16 and 16' from the holding roll, in this case 10, it is wound upon this roll 11. While the roll 11 is receiving its winding tension from the spring 56, the web holding roll 10 is being retarded so as to unwind the web only as it is being fed by the rolls 16 in the manner now to be described.

One end of the roll 10 extends into the side frame 12 and has formed thereon a pinion 73ª which is geared by means of intermeshing large gears 72ª and small gears 71ª to the large gear 70ª carried by the shaft 65ª. The shaft 65ª as in the case of its corresponding shaft 65 is divided, one portion of the same having its bearings in the upper part of the standard 69ª while its other portion is journaled in the arm 66ª, said shaft also having at its inner extremity a beveled pinion 68ª. The arm 66ª is connected to a sliding bar 81 slidably mounted in the guide way 67, which bar extends beneath the case 57 for the spring 56 in order to be similarly and rigidly connected with the arm 66. The guide way 67 near the end adjacent the shaft 69ª is provided with vertically extending standards 82 on the top of which is mounted a semi-circular frame 83 to support a friction brake 84 the shoe 84' being of crescent shape so as to conform to the contour of the pinion 68ª against which it normally bears when the shaft 65ª is disposed in its retracted position shown in Fig. 2. The brake 84 consists also of a tension rod 85 upon which is mounted a spring 86 normally bearing against the frame 83, said rod being threaded and provided with an adjusting nut 87 to regulate the tension of the shoe 85 against the pinion 68ª. Hence it will be understood that as the web is pulled from the roll 10 it is retarded by the frictional contact of the brake 84 so as to give off the web only as desired.

Incidental to the construction, I preferably provide a cover 88 secured to the bottom of the casing 1 and partially housing the innermost edge portion of the large gear 64 to prevent accidental contact of the web 15 therewith.

*Reversing mechanism.*—The foregoing description has set forth the movement of the web from the upper to the lower web roll such as would agree when the conveyance carrying the indicator is traversing its route in one direction and when the end of the line or its destination in that direction has been reached it will be understood the direction of feeding of the web must be reversed so as to feed from the lower to the upper roll. To accomplish this as well as a reversal of the coöperating mechanisms of the device, reversing means is employed as will now be described.

Figures 11, 13, 14:
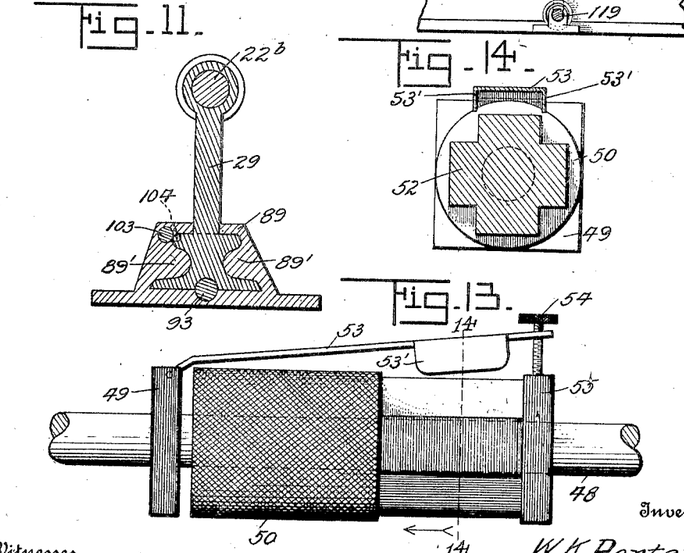
Fig. 11 is a vertical transverse sectional view taken about on the line 11—11 of Fig. 2.
Fig. 13 is an enlarged elevation of the adjusting member for the stroke lever.
Fig. 14 is a vertical sectional view on the line 14—14 of Fig. 13.

The free end of the web having been properly secured upon the upper roll 10, being passed, of course, through the feed rolls 16, 16' this roll now becomes the receiving roll while the roll 11 from which the web is fed will be the holding roll. The driving shaft 22 as has been stated previously is journaled at its inner portion in the arm 29 which is movably mounted in the guide way 89 which guide way extends transversely throughout the greater portion of the casing 1 just beneath the standard 35 and as will be noted in Fig. 11 the arm 29 is provided with lateral grooves so as to readily operate between tongued extensions 89' of the guide way 89 and, furthermore, this arm is integrally formed upon a sliding bar 90 which extends across the device to the opposite end portion of the guide way 89 where it has formed on its extremity a movable vertically disposed arm 29ª similar in all respects to the arm 29. The bottom portion of the slide 90 carrying the arms 29 a 1 29ª is suitably toothed as indicated at 91 to mesh with a worm 92 on the end portion of the reversing rod 93 which is revolubly mounted beneath the slide 90 and in the guide way 89. This rod 93 passes out of the guide way 89 at one end and across the device, terminating exterior to the casing 1 in a finger piece 94 by means of which the rod may be readily manipulated. By turning the rod 93 in one direction, the slide 90 with its arms 29 and 29ª will be moved across the device in the guide way 89 through the action of the worm 92 and the meshing teeth 91 until the gear 31 is out of mesh with the drive gear 32, the movable section 22ᵇ of the shaft 22 permitting by reason of the pin and slot connection 30 this disengagement. Simultaneously with the disengagement of the pinion 31 from the wheel 32 the arm 29ª brings the divided section 22ᶜ of the shaft 22ᵈ with which the former has pin and slot connection at 30ª, toward the drive wheel 32 until the pinion 31ª at its inner extremity engages with said drive wheel 32. The stationary section of the shaft 22ᵈ is journaled at the top of the standing 28ª. Obviously motion imparted to the wheel 32 will be transmitted through the shaft 22ᵈ to the large sprocket wheel 21 whence it is conveyed by the chain 19 to the cog wheels 18 carried by the ends of the feed rollers 16 at the opposite side of the device to those cogs hereinbefore mentioned. These feed rollers are thus caused to rotate in an opposite direction to that formerly described so that the web is positively fed upwardly from the roll 11 to the roll 10. Obviously the tension formerly exerted upon the roll 11 by the spring 56 must now be transferred to the roller 10 and to this end the reversing rod 93 is provided with a beveled gear 95 near one end of the guide way 89 which gear meshes with a corresponding gear 96 carried by the end of a longitudinal shaft 97 extending toward the forward portion of the device and mounted in suitable bearings 98 on the bottom of the casing 1. The opposite end of the shaft 97 carries a beveled gear 99 meshing with a similar gear 100 on a short transverse shaft 101. This latter shaft is provided with a worm 102 which meshes with teeth formed on the bottom of the slide 81 which carries at its ends arms 66ª and 66 respectively. In this manner the movement of the reversing rod 93 will cause the slide 81 to carry the arm 66ª with the longitudinally movable section of the divided shaft 65ª transversely of the device until the pinion 68ª is brought into engagement with the peripheral gear teeth on the disk 64, simultaneously disengaging the pinion 68 from the opposite side of the gear 64 by reason of the movement of the arm 66 in the guide way 67 which carries the divided shaft 65. It will be understood that the movement of the divided shaft 65ª relieves the braking action against the pinion 68ª while the pinion 68 is brought into contact with the brake 84ª carried by the standard 82ª which brake is similar in all respects to that described with reference to the brake 84. The tension of the spring 56 in this manner is carried through the divided shaft 65ª and through the train of gears 70ª, 71ª and 72ª to the pinion 73ª on the end of the web roll 10 and on the contrary retarding action has now been transferred to the roll 11 due to the action of the brake 84ª on the pinion 68 carried by the shaft 65, through the instrumentality of the train of gears 70, 71, and 72 to the pinion 73 on the short shaft 74 and from thence through the shaft 77 geared to the latter at one end and to the web roll 11 geared to its other end.

Figure 1:
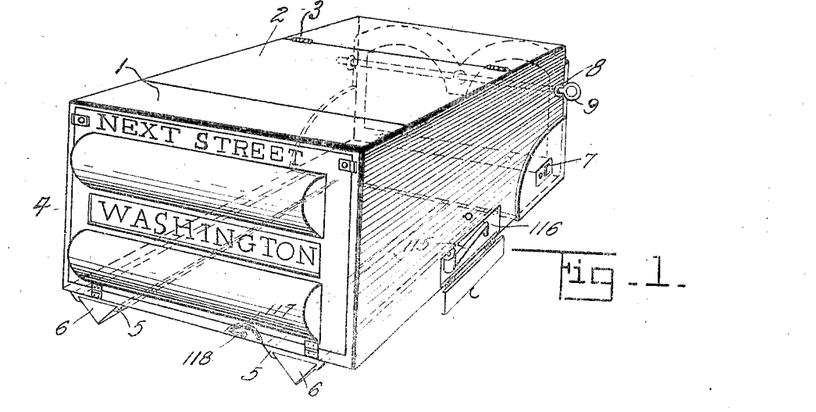
Figure 1 is a perspective view showing the mounting of a device constructed in accordance with my invention upon its supporting bracket.
Figure 2:
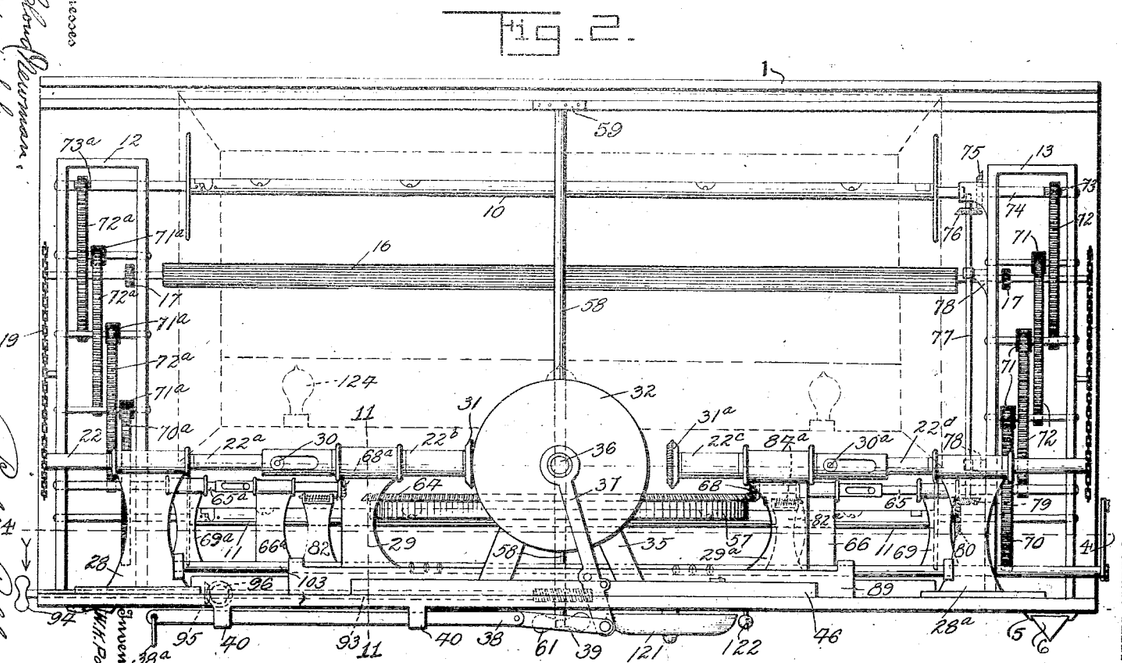
Fig. 2 is a rear elevation of my invention with the ends and back of the casing omitted, the lower feeding rolls being omitted and the reflector shown in dotted lines for the purpose of clearness.

*Locking mechanism.*—In order that no accidental movement of the mechanisms may occur in their positions as have been set forth, I provide means for locking the co-operating parts such for instance as when in the position shown in Fig. 2, just described. In this figure it will be observed that a locking rod 103 is disposed on the guide way 89 and at the front side of the same which rod has formed thereon in spaced relation to each other sets of projections 104 which projections are adapted normally to engage in notches 105 formed on the forward and lateral portion of the sliding bar 90, a sufficient number of these notches 105 being provided to give a certain amount of latitude of locking engagement with the teeth 104 so as to insure the proper positioning of the movable sections 22ᵇ and 22ᶜ of the shafts 22 and 22ᵈ, respectively. When it is desired to reverse the operation of the web a handle 106 carried by the outer extremity of the locking rod 103, exterior to the casing 1 is pulled forwardly until it lockingly engages with the bent end portion of a resilient arc shaped member 107 secured to the side of the casing 1 as shown in Fig. 4. The teeth 104 are thus disengaged from the notches 105 so that the reversing rod 93 may be operated until the reversed position is obtained, but during the reversing action the tension of the spring is held inoperative by a brake secured to one side of the locking rod 103 which engages with the large horizontal gear 64. This brake consists of a curved arm 108 connected at 109 to the rod 103 and at its other end through a link 110 to a plunger rod 111. This rod is placed under tension by means of a spring 112 against which spring the plunger presses in the normal inoperative position of the brake. The free extremity of the rod 111 carries a brake arm 113 having a triangular projection 114 adapted to engage with the teeth of the large gear 64 when the locking rod 103 is moved into the position just described. This gear is then held from movement under the actuation of the spring 56 until the handle 106 is moved rearwardly to engage in the detent portion at the opposite end of the resilient member 107, this latter position engaging the teeth 104 with the notches 105 on the slide 90.

*General summary.*—The operation of the device will have become apparent from consideration of the foregoing description and it may be generally stated in conclusion that when the conveyance carrying the indicator device comprising this invention is about to be started upon its route the conductor or other operator sets the device properly for indication. To do this he first secures a key 115 from a compartment 116 conveniently formed in the casing 1, placing said key on the squared end 22ᵉ of the shaft 22 which projects exterior to the casing 1 turning the shaft until the name of the first street on the web, the free end of which has been previously engaged with the receiving roll, comes opposite the glass 4. It is assumed, of course, that the stroke regulator has been properly set in order that the actuation of the web will bring the next name on the same to this position. At a convenient point of travel of the conveyance the conductor will pull a strap which is secured to a ring 38ª on the free end of the operating rod 38, thereby actuating the gear 32 so as to move the web at a single stroke to the proper position for the next named street. This intermittent operation of the web continues until the end of the route is reached when the operation reverses. Before further manipulation the operator must move the handle 106 on the locking rod 103 so as to unlock the mechanism, whereupon the reversing rod 93 is manipulated so as to reverse the driving shafts and shafts controlling the tension on the web rolls. The reversing rod 93 having been turned its limit the handle 106 is moved into its normal or initial position and the device is ready again for intermittent operation to indicate the streets in their reverse order to agree with the direction.

Coöperating with the mechanism hereinbefore described I preferably employ also a route indicator which consists of a segmental plate 117 on the forward face of the device which plate is suitably marked at one side with the word "In" and at its opposite side with the word "Out" or such other indications desired. With this segment an indicator 118 coöperates, the same consisting of the angular or bent extremity of a spring actuated rod 119 adjacent the front of the casing mounted in suitable bearings and at a position so that its inner extremity 120, which is bent upwardly, will frictionally engage with a V-shaped projection 120' on one side of the arm 66ª. It will be obvious as the arm 66ª is moved in the reversal operation transversely of the machine the indicator 118 will be moved from one side of the segment to the other so as to indicate to the operator the direction of travel of the web. I also prefer to employ an alarm device or some signal means to attract the attention of the passengers on the conveyance to the announcement of the next street. For this purpose I provide a gong 121 secured beneath the casing 1 having a spring actuated tapper 122 to ring the same, the tapper or hammer 122 being pivotally mounted and having its upper end portion extending within the casing adjacent the guide way 46 for the stroke regulating mechanism. The block 44 carries a spring actuated dog 123 which engages the upper end of the hammer 122 as the stroke lever 37 is actuated to pull the link 45, thus causing the gong to be rung. Within the casing are also provided a suitable number of electric bulbs 124 located just in rear of the web so as to illuminate the name of the street just in rear of the glass sight opening 4. To these bulbs an electrical current is led by the wires 125 disposed in a conduit 126, while a reflector 127 is located in rear of the bulbs, all of this lighting apparatus being mounted upon a standard 128 and being accessible through a narrow door 129 just beneath the reflector 127.

Having thus described the invention, what I claim as new is:

1. An indicator device of the class described comprising a web, web rolls adapted to hold and receive the web, means for positively feeding the web from one roll to the other, actuating means for intermittently operating the feeding means aforesaid, spring actuated means for actuating the roll receiving the web and independent of the feeding means, and manually operable means to simultaneously reverse the feeding means aforesaid and transfer the actuation from the roll last mentioned to the other web roll.

2. An indicator device of the class described comprising a web, web rolls adapted to hold and receive the web, means for positively feeding the web from one roll to the other, actuating means for intermittently operating the feeding means aforesaid, means for actuating the roll receiving the web, means operable to simultaneously reverse the feeding means aforesaid and transfer the actuation from the roll last mentioned to the other web roll, and retarding means for said rolls operable only upon the roll holding the web to hold the web taut between the web rolls.

3. An indicator device of the class described comprising a web, web holding and receiving rolls, feeding means for feeding the web from the holding to the receiving roll, an actuating member, a driving shaft connecting the actuating member with the feeding means, a supporting member in which the driving shaft is journaled, means for moving the supporting member to move the shaft longitudinally for engagement and disengagement of said shaft with the actuating member, and a locking member adapted to interlock with said supporting member to hold the driving connection in or out of engagement with the actuating member.

4. An indicator device of the class described, comprising a web, web holding and receiving rolls, feeding means for feeding the web from the holding to the receiving roll, independent driving connections for operating the feeding means in different directions, an actuating member for said driving connections, coöperating supports for said driving connections and a locking member interlocking with the supports to hold one of the driving connections in engagement with the actuating member for operation of the feeding means in one direction, and releasable to permit engagement of the other driving connections with the actuating member for operation of the feeding means in a direction opposite that aforesaid.

5. An indicator device of the class described comprising a web, web holding and receiving rolls, feeding means for feeding the web from the holding to the receiving roll, reversible actuating mechanism for operating the feeding means, a locking member normally coöperating with the actuating mechanism aforesaid to hold the same in a predetermined position and adapted to be disengaged to permit reversal of the same, means for reversing the actuating mechanism, tensioning mechanism for actuating one of the web rolls during operation of the feeding means, and means connected with the locking member aforesaid coöperating with the tensioning mechanism to hold the latter from operation during the reversal of the actuating mechanism.

6. An indicator device of the class described comprising a web, spaced web holding and receiving rolls, feeding rolls for feeding the web from the holding to the receiving roll, actuating mechanism, driving means operably connecting the same to the feeding rolls at one end for feeding the web in one direction, and independent driving means adapted to connect the other end of the feeding rolls with said actuating mechanism for movement of the web in an opposite direction upon discontinuance of action of the first driving means.

7. An indicator device of the class described comprising a web, spaced web holding and receiving rolls, feeding rolls for feeding the web from the holding to the receiving roll, actuating mechanism, driving means operably connecting the same to the feeding rolls at one end for feeding the web in one direction, independent driving means adapted to connect the other end of the feeding rolls with said actuating mechanism for movement of the web in an opposite direction upon discontinuance of action of the first driving means, and means for reversing connection of said driving means with the actuating mechanism.

8. An indicator device of the class described comprising a web, spaced web holding and receiving rolls, feeding rolls for feeding the web from the holding to the receiving roll, actuating mechanism, driving means operably connecting the same to the feeding rolls at one end for feeding the web in one direction, independent driving means adapted to connect the other end of the feeding rolls with said actuating mechanism for movement of the web in an opposite direction upon discontinuance of action of the first driving means, and means for holding the web taut during feeding of the same from one roll to the other.

9. An indicator device of the class described comprising a web, spaced web holding and receiving rolls, feeding rolls for feeding the web from the holding to the receiving roll, actuating mechanism, driving means operably connecting the same to the feeding rolls for feeding the web in one direction, common energy storing means for actuating either of the web rolls, and means operably connecting the energy storing means to the receiving roll for normally tending to actuate said roll to receive the web from the feeding rolls.

10. An indicator device of the class described comprising a web, spaced web holding and receiving rolls, feeding rolls for feeding the web from the holding to the receiving roll, actuating mechanism, driving means operably connecting the same to the feeding rolls, for feeding the web in one direction, common energy storing means for actuating either of the web rolls, means operably connecting the energy storing means to the receiving roll for normally tending to actuate said roll to receive the web from the feeding rolls, and a reversing member coöperating with the aforesaid driving means and the actuating means for the web rolls whereby to reverse movement of the feeding rolls and actuation of the web rolls.

11. An indicator device of the class described comprising a web, web holding and receiving rolls, feeding rolls adapted to feed the web from the holding to the receiving roll, longitudinally movable driving shafts operably connected to the feeding rolls, movable supporting members in which said shafts are journaled, a drive gear interposed between said shafts and adapted to be engaged by one or the other of said shafts upon movement of the journal supports aforesaid to operate the feeding rolls in different directions, means for moving said supports, and means for actuating the drive gear aforesaid.

12. An indicator device of the class described comprising a web, spaced web holding and receiving rolls, feeding rolls adapted to feed the web from the holding to the receiving roll, driving shafts operably connected to the feed rolls, arms in which said shafts are journaled, a bar member connecting said arms, a drive gear adapted to be engaged by said shafts, means for intermittently operating the drive gear, and means for operating the bar member to cause disengagement of one of the driving shafts from and the engagement of the other driving shaft with the drive gear aforesaid.

13. An indicator device of the class described comprising a web, spaced web holding and receiving rolls, feeding rolls adapted to feed the web from the holding to the receiving roll, a driving shaft operably connected to one end of the feeding rolls, a second driving shaft operably connected to the other end of said feeding rolls, a common drive gear for said shafts, and means for reversing the engagement of the driving shafts aforesaid with the drive gear whereby to actuate the feeding rolls in opposite directions.

14. An indicator device of the class described comprising a web, spaced web holding and receiving rolls, feeding rolls adapted to feed the web from the holding to the receiving roll, a driving shaft operably connected to one end of the feeding rolls, a second driving shaft operably connected to the other end of said feeding rolls, a common drive gear for said shafts, means for reversing the engagement of the driving shafts aforesaid with the drive gear whereby to actuate the feeding rolls in opposite directions, an actuating shaft operably connected to one of the web rolls, and tensioning means for actuating said web roll through the actuating shaft just mentioned.

15. An indicator device of the class described comprising a web, spaced web holding and receiving rolls, feeding rolls adapted to feed the web from the holding to the receiving roll, a driving shaft operably connected to one end of the feeding rolls, a second driving shaft operably connected to the other end of said feeding rolls, a common drive gear for said shafts, means for reversing the engagement of the driving shafts aforesaid with the drive gear whereby to actuate the feeding rolls in opposite directions, actuating shafts operably connected with the web rolls, tensioning means adapted to be connected with one of the actuating shafts to actuate one of the web rolls, and means engaging the other actuating shaft to retard movement of the other of said web rolls.

16. An indicator device of the class described comprising a web, spaced web holding and receiving rolls, feeding rolls adapted to feed the web from the holding to the receiving roll, a driving shaft operably connected to one end of the feeding rolls, a second driving shaft operably connected to the other end of said feeding rolls, a common drive gear for said shafts, a rotatable rod member for reversing the engagement of the driving shafts aforesaid with the drive gear whereby to actuate the feeding rolls in opposite directions, actuating shafts operably connected with the web rolls, tensioning means adapted to be connected with one of the actuating shafts to actuate one of the web rolls, and a brake adapted to engage the other actuating shaft to retard movement of the other of said web rolls.

17. An indicator device of the class described comprising a web, spaced web holding and receiving rolls, feeding rolls adapted to feed the web from the holding to the receiving roll, a driving shaft operably connected to one end of the feeding rolls, a second driving shaft operably connected to the other end of said feeding rolls, a common drive gear for said shafts, actuating shafts operably connected with the web rolls, tensioning means adapted to be connected with one of the actuating shafts to actuate one of the web rolls, braking means adapted to engage the actuating shafts whereby the other of said web rolls may be retarded, and means for reversing engagement of the driving shafts aforesaid with the drive gear and simultaneously reversing connection of the actuating shafts with the tensioning and retarding means aforesaid.

18. An indicator device of the class described comprising a web, spaced web holding and receiving rolls, feeding rolls adapted to feed the web from the holding to the receiving roll, a driving shaft operably connected to one end of the feeding rolls, a second driving shaft operably connected to the other end of said feeding rolls, a common drive gear for said shaft, means for reversing the engagement of the driving shafts aforesaid with the drive gear whereby to actuate the feeding rolls in opposite directions, and a locking rod coöperating with the last-mentioned means to hold the driving shafts in their respective engaged positions with the drive gear.

19. An indicator device of the class described comprising a web, spaced web holding and receiving rolls, feeding rolls adapted to feed the web from the holding to the receiving roll, a driving shaft operably connected to one end of the feeding rolls, a second driving shaft operably connected to the other end of said feeding rolls, a common drive gear for said shafts, means for reversing the engagement of the driving shafts aforesaid with the drive gear whereby to actuate the feeding rolls in opposite directions, an actuating shaft operably connected to one of the web rolls, tensioning means for actuating said web roll through the actuating shaft just mentioned, and a locking rod adapted to hold the driving shafts in their respective engagements with the drive gear in one position and in another position to coöperate with the tensioning mechanism during the reversal of the driving shafts to prevent operation of the web roll.

20. An indicator device of the class described comprising a web, web holding and receiving rolls, feeding rolls for feeding the web from the holding to the receiving roll, a pair of spaced driving shafts connected to the opposite ends of the feeding rolls, arms in which said shafts are journaled, a bar carrying said arms, a drive gear, a lever for operating said gear, a locking rod normally engaging the bar aforesaid to hold one of the driving shafts connected to the drive gear, and a reversing rod operably connected to the bar and adapted to disconnect one driving shaft and connect the other driving shaft with the drive gear.

21. An indicator device of the class described comprising a web, web holding and receiving rolls, feeding rolls for feeding the web from the holding to the receiving roll, a pair of spaced driving shafts connected to the opposite ends of the feeding rolls, arms in which said shafts are journaled, a bar carrying said arms, a drive gear, a lever for operating said gear, a locking rod normally engaging the bar aforesaid to hold one of the driving shafts connected to the drive gear, a reversing rod operably connected to the bar and adapted to disconnect one driving shaft and connect the other driving shaft with the drive gear, tensioning mechanism for actuating the web rolls including a main gear operably connected with one of said rolls, the locking rod aforesaid being movable to release the bar to permit reversal of the driving shafts, and means operable by said locking rod to engage the main tension gear aforesaid to hold the tensioning mechanism inactive during reversal.

22. An indicator device of the class described comprising a web, web holding and receiving rolls, feeding rolls for feeding the web from one to the other of said rolls, a pair of driving shafts each consisting of a relatively stationary section operably connected to the feeding rolls aforesaid and a relatively movable section, standards in which the stationary sections of the driving shafts are mounted, arms in which the movable sections of said shafts are journaled, a bar member connecting said arms, pinions carried by the free ends of the driving shafts aforesaid, a drive gear adapted to be engaged by the pinion of one of said driving shafts, a stroke lever for intermittently operating the drive gear, and an actuating rod connected with said stroke lever.

23. An indicator device of the class described comprising a web, web holding and receiving rolls, feeding rolls for feeding the web from one to the other of said rolls, a pair of driving shafts each consisting of a relatively stationary section operably connected to the feeding rolls aforesaid, and a relatively movable section, standards in which the stationary sections of the driving shafts are mounted, arms in which the movable sections of said shafts are journaled, a bar member connecting said arms, pinions carried by the free ends of the driving shafts aforesaid, a drive gear adapted to be engaged by the pinions of one of said driving shafts, a stroke lever for intermittently operating the drive gear, an actuating rod connected with said stroke lever, the bar member aforesaid having teeth beneath the same, a reversing rod having a worm thereon to engage the teeth of the bar member aforesaid whereby on rotation of the reversing rod the pinion engaging the drive gear is adapted to be disengaged therefrom and the pinion on the other driving shaft adapted to be engaged with said drive gear.

24. An indicator device of the class described comprising a web, web holding and receiving rolls, feeding rolls for feeding the web from one to the other of said rolls, a pair of driving shafts each consisting of a relatively stationary section operably connected to the feeding rolls aforesaid, and a relatively movable section, standards in which the stationary sections of the driving shafts are mounted, arms in which the movable sections of said shafts are journaled, a bar member connecting said arms, pinions carried by the free ends of the driving shafts aforesaid, a drive gear adapted to be engaged by the pinions of one of said driving shafts, a stroke lever for intermittently operating the drive gear, an actuating rod connected with said stroke lever, the bar member aforesaid having teeth beneath the same, a reversing rod having a worm thereon to engage the teeth of the bar member aforesaid whereby on rotation of the reversing rod the pinion engaging the drive gear is adapted to be disengaged therefrom and the pinion on the other driving shaft adapted to be engaged with said drive gear, the bar member aforesaid also having notches therein, and a locking rod normally engaging said notches to hold the driving shafts in their respective engagements with the drive gear.

25. An indicator device of the class described comprising a web, web holding and receiving rolls, feeding rolls for feeding the web from one to the other of said rolls, a pair of driving shafts each consisting of a relatively stationary section operably connected to the feeding rolls aforesaid and a relatively movable section, standards in which the stationary sections of the driving shafts are mounted, arms in which the movable sections of said shafts are journaled, a bar member connecting said arms, pinions carried by the free ends of the driving shafts aforesaid, a drive gear adapted to be engaged by the pinion of one of said driving shafts, a stroke lever for intermittently operating the drive gear, an actuating rod connected with said stroke lever, tensioning mechanism for the web rolls comprising a main spring, a gear member actuated by said spring, actuating shafts each comprising a relatively stationary section and a relatively movable section, standards in which the stationary sections are mounted, arms in which the movable sections are journaled, and a pinion on the free end of each actuating shaft, one of which is adapted to be engaged with the gear member aforesaid whereby tension of the spring is transmitted through one of said actuating shafts to one of the web rolls.

26. An indicator device of the class described comprising a web, web holding and receiving rolls, feeding rolls for feeding the web from one to the other of said rolls, a pair of driving shafts each consisting of a relatively stationary section operably connected to the feeding rolls aforesaid and a relatively movable section, standards in which the stationary sections of the driving shafts are mounted, arms in which the movable sections of said shafts are journaled, a bar member connecting said arms, pinions carried by the free ends of the driving shafts aforesaid, a drive gear adapted to be engaged by the pinion of one of said driving shafts, a stroke lever for intermittently operating the drive gear, an actuating rod connected with said stroke lever, tensioning mechanism for the web rolls comprising a main spring, a gear member actuated by said spring, actuating shafts each comprising a relatively stationary section and a relatively movable section, standards in which the stationary sections are mounted, arms in which the movable sections are journaled, a pinion on the free end of each actuating shaft, one of which is adapted to be engaged with the gear member aforesaid whereby tension of the spring is transmitted through one of said actuating shafts to one of the web rolls, a bar member connected with the arms for the movable sections of the actuating shafts, a reversing rod operably connected to the bar members for moving the driving and actuating shafts aforesaid whereby to reverse the movement of the feeding rolls and transfer tension from one web roll to the other of said web rolls.

27. An indicator device of the class described comprising a web, web holding and receiving rolls, means for feeding the web from the holding to the receiving roll, a driving shaft operatively connected with the feeding means, a drive gear for operating said driving shaft, a stroke lever for intermittently actuating the drive gear, means for regulating the movement of the stroke lever, said means comprising an adjustable stop member, means for longitudinally moving the stop member to increase or decrease the stroke of the stroke lever aforesaid, and a scale indicia coöperating with the stop member for predetermining the adjustment of said member.

28. An indicator device of the class described comprising a web, web holding and receiving rolls, means for feeding the web from the holding to the receiving roll, a driving shaft operatively connected with the feeding means, a drive gear for operating said driving shaft, a stroke lever for intermittently actuating the drive gear, means for regulating the movement of the stroke lever, said means comprising an adjustable stop member, an adjusting nut connected with the stop member for longitudinally moving the latter toward and away from the said lever, and means for locking the adjusting nut against accidental movement.

29. An indicator device of the class described comprising a web, web holding and receiving rolls, feeding rolls for feeding the web from one to the other of said rolls, driving means for actuating said feeding rolls, tensioning mechanism operatively connected with the web rolls, and means operatively connected with the tensioning mechanism aforesaid to indicate the direction of travel of the web.

30. An indicator device of the class described comprising a web, web holding and receiving rolls, means for feeding web from the holding to the receiving roll, tensioning mechanism for actuating the web rolls to receive the web fed thereto by the feeding means aforesaid, the tensioning mechanism aforesaid comprising an actuating shaft operatively connected to the web rolls, relatively stationary and movable standards on which said shaft is journaled, and a route indicator connected to the movable standard and adapted to be operated thereby.

31. An indicator device of the class described comprising a web, web holding and receiving rolls, means for feeding web from the holding to the receiving roll, tensioning mechanism for actuating the web rolls to receive the web fed thereto by the feeding means aforesaid, the tensioning mechanism aforesaid comprising an actuating shaft operatively connected to the web rolls, relatively stationary and movable standards on which said shaft is journaled, a route indicator connected to the movable standard and adapted to be operated thereby, and means for moving the relatively movable standard aforesaid.

32. An indicator device of the class described comprising a web, web holding and receiving rolls, feeding means for feeding the web from the holding to the receiving roll, driving mechanism for said feeding means, tensioning mechanism for actuating and retarding the web rolls, means for reversing the feeding means and the tensioning mechanism aforesaid, and a route indicator operatively connected with the tensioning mechanism and adapted to be actuated by the reversing means for the feeding means and the tensioning mechanism aforesaid.

In testimony whereof I affix my signature in presence of two witnesses.

WILLIAM K. PORTER.

Witnesses:
 SAMUEL J. WYNN,
 MARTIN J. GRIFFIN